United States Patent
Kvernvik et al.

(10) Patent No.: US 10,410,137 B2
(45) Date of Patent: Sep. 10, 2019

(54) METHOD AND SYSTEM FOR ANALYZING ACCESSES TO A DATA STORAGE TYPE AND RECOMMENDING A CHANGE OF STORAGE TYPE

(71) Applicant: Telefonaktiebolaget LM Ericsson (publ), Stockholm (SE)

(72) Inventors: Tor Kvernvik, Täby (SE); Simon Moritz, Stockholm (SE); Tony Larsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 14/913,219

(22) PCT Filed: Aug. 23, 2013

(86) PCT No.: PCT/SE2013/050993
§ 371 (c)(1),
(2) Date: Feb. 19, 2016

(87) PCT Pub. No.: WO2015/026273
PCT Pub. Date: Feb. 26, 2015

(65) Prior Publication Data
US 2016/0203416 A1    Jul. 14, 2016

(51) Int. Cl.
*G06N 20/00* (2019.01)
*G06N 5/04* (2006.01)
*G06F 11/34* (2006.01)

(52) U.S. Cl.
CPC ......... *G06N 20/00* (2019.01); *G06F 11/3452* (2013.01); *G06N 5/047* (2013.01); *G06F 11/3409* (2013.01)

(58) Field of Classification Search
USPC .......................................................... 706/12
See application file for complete search history.

(56) References Cited

U.S. PATENT DOCUMENTS 9,098,860 B2 *   8/2015   Bjork .................... G06Q 30/02
9,135,572 B2 *   9/2015   Bjork .................. G06N 99/005
(Continued)

OTHER PUBLICATIONS

ACM (DL) Digital Library Issues in data stream management Lukasz Golab & M. Tamer Özsu, Newsletter ACM SIGMOD Record Homepage archive vol. 32 Issue 2, Jun. 2003 pp. 5-14 ACM.*

(Continued)

*Primary Examiner* — Michael B Holmes
(74) *Attorney, Agent, or Firm* — Sage Patent Group

(57) ABSTRACT

A method is provided for analyzing data storage applied on at least one data storage type. The data to be stored is transmitted in at least one data stream between at least one application instance and the at least one data storage type. The method includes accessing, from the at least one data stream, data selected according to pre-defined rules. Data access patterns are aggregated on the basis of the selected data, where the data access patterns are indicative of the at least one storage type applied. Classifiers are obtained by applying trained classifiers to the aggregated data access patterns. Differences between the obtained classifiers and the trained classifiers are analyzed to determine, that the obtained classifiers are indicative of at least one data storage type other than a presently used data storage type, in case at least one predefined threshold value is exceeded when analyzing the differences.

17 Claims, 6 Drawing Sheets

(56) References Cited

U.S. PATENT DOCUMENTS

| | | | | |
|---|---|---|---|---|
| 9,251,524 | B2* | 2/2016 | Moritz | G06Q 30/0277 |
| 9,305,110 | B2* | 4/2016 | Hildorsson | G06F 17/30958 |
| 9,330,162 | B2* | 5/2016 | Moritz | H04H 60/31 |
| 9,460,156 | B2* | 10/2016 | Moritz | G06Q 30/0282 |
| 9,491,045 | B2* | 11/2016 | Kvernvik | H04L 41/0681 |
| 9,542,471 | B2* | 1/2017 | Carlsson | G06F 16/284 |
| 9,584,622 | B2* | 2/2017 | Kvernvik | H04L 12/5691 |
| 9,654,590 | B2* | 5/2017 | Kvernvik | H04M 15/00 |
| 9,913,284 | B2* | 3/2018 | Larsson | H04L 47/127 |
| 9,928,209 | B2* | 3/2018 | Huang | H04N 21/64784 |
| 10,117,108 | B2* | 10/2018 | Moritz | H04W 24/02 |
| 2002/0046204 | A1 | 4/2002 | Hayes | |
| 2007/0061289 | A1 | 3/2007 | Brown et al. | |

OTHER PUBLICATIONS

ACM (DL) Digital Library YALE: rapid prototyping for complex data mining tasks, Ingo Mierswa, Michael Wurst, Ralf Klinkenberg, Martin Scholz, Timm Euler KDD '06 Proceedings of the 12th ACM SIGKDD international conference on Knowledge discovery and data mining pp. 935-9400 Aug. 20-23, 2006 ACM.*

ACM (DL) Digital Library SAP HANA database: data management for modern business applications, Franz Färber, Sang Kyun Cha, Jürgen Primsch, Christof Bornhövd, Stefan Sigg, Wolfgang Lehner ACM SIGMOD Record archive vol. 40 Issue 4, Dec. 2011 pp. 45-51 ACM.*

ACM (DL) Digital Library Semantics and evaluation techniques for window aggregates in data streams, Jin Li, David Maier, Kristin Tufte, Vassilis Papadimos, Peter A. Tucker, SIGMOD '05 Proceedings of the 2005 ACM SIGMOD international conference on Management of data pp. 311-322 ACM.*

ACM DigitalLibrary Issues in data stream management Lukasz Golab; M. Tamer Özsu ACM SIGMOD Record vol. 32 Issue 2, Jun. 2003 pp. 5-14.*

ACM DigitalLibrary Flexible and scalable storage management for data-intensive stream processing; Irina Botan; Gustavo Alonso; Peter M. Fischer; Donald Kossmann; Nesime Tatbul EDBT '2009 Proceedings of the 12th International Conference on Extending Database Technology: Advances in Database Tech pp. 934-945 2009.*

International Search Report, Application No. PCT/SE2013/050993, Nov. 22, 2013.

Written Opinion of the International Searching Authority, Application No. PCT/SE2013/050993, Nov. 22, 2013.

Mathkour et al., "A Machine Learning Technique for Monitoring Database Systems", *IEEE Symposium on Computers and Communications*, Los Alamitos, CA, Jul. 27, 1995, pp. 421-427.

* cited by examiner

METHOD AND SYSTEM FOR ANALYZING ACCESSES TO A DATA STORAGE TYPE AND RECOMMENDING A CHANGE OF STORAGE TYPE

CROSS REFERENCE TO RELATED APPLICATION

This application is a 35 U.S.C. § 371 national stage application of PCT International Application No. PCT/SE2013/050993, filed on Aug. 23, 2013, the disclosure and content of which is incorporated by reference herein in its entirety. The above-referenced PCT International Application was published in the English language as International Publication No. WO 2015/026273 A1 on Feb. 26, 2015.

TECHNICAL FIELD

A method for analyzing data storage on at least one data storage type, and a processing device suitable for performing such an analyzing process.

BACKGROUND

Systems which include data processing usually require excessive planning and knowledge on available alternatives before a technology to apply for the data processing which provides for an efficient and economical solution can be chosen. It is however becoming harder and harder for application developers, enterprises, etc. to know which type of technology that best suits their needs, and it is especially hard to predict future needs, due e.g. to possible future changes in the user behaviour and thereby changed requirements from the used technology. Today these types of processes rely entirely on technical experts and their knowledge on which technology that is "best" suited at the moment and which technology is expected to be the "best" choice also for the future. Such a selection process is therefore to a large degree executed as a manual process which is almost inevitably both costly and time consuming.

It is also hard to determine when the current solution no longer works optimal, and thus when there would be more advantageous to use another, alternative technology. Underlying reasons for a change of database technology could e.g. be major changes in the applied data access patterns, changes in the amount of data stored/retrieved, new requirements from one or more applications using the data to be handled by the used database/s, new usage of an application or new usage of stored data generated by an application.

The amount of data generated each day is growing faster and faster. The number of different database solutions available for handling this data is also growing rapidly, and there are today a multitude of different database solutions to choose from, such as e.g.:

RDBMS:
Key-value stores
Graph database:
In-memory databases:
Document databases:

Each of these database technologies (and in some cases specific data processing solutions) has certain characteristics, advantages and disadvantages and is therefore, on a case by case basis, more or less suitable for handling certain types of data at least partly depending on the data access patterns applied.

RDBMS (Relational Database Management System) is a database which stores data in form of related tables. This type of database is powerful because it requires few assumptions about how data is related or how it will be extracted from the database. As a result, the same database can be viewed in many different ways.

One drawback with RDBMS is that it is relatively slow when processing relational data. Another commonly known drawback with RDBMS is that it tend to suffer from scalability limitations.

However, RDBMS has been commonly used up until now within most industries and can be found in a wide range of products.

The NoSQL movement, not only SQL movement, addressed by e.g. Google, Facebook and Amazon to name a few, has targeted other challenges to handle data that is not suitable for RDBMS. Those challenges included handling of large volumes of data without using any specific schema. Due to the amounts of data it is normally distributed over several machines, making JOIN operations (commonly used in RDBMS) not sufficient. NoSQL are normally built on record storage (key-value stores). The NoSQL storage cannot handle relational models data structures, but are great for handling large scale data and real time applications and is used e.g. by Google, Facebook, and Twitter.

Document-oriented databases are one of the main categories of so-called NoSQL. The central concept of a document-oriented database is the notion of a Document.

Graph databases have nodes, edges and properties, where every node contains a pointer to the adjacent element why no indexes lookup is needed. Compared with relational databases, graph databases are often faster for associative, data sets, and map more directly to the structure of object-oriented applications and Graph databases scales better since they typically do not need join operations, Graph Databases are typically faster in calculating shortest paths between nodes.

In-memory databases primarily rely on a main memory of a computer main storage. Main memory databases are faster than disk-optimized databases since the internal optimization algorithms are simpler and execute fewer CPU instructions. They also reduce I/O when accessing data why the overall response time is improved further. This type of databases are, however, often expensive and can not store as much data as a distributed system can.

Document-oriented databases are one of the main categories of so-called NoSQL. The central concept of a document-oriented database is the notion of a Document.

When determining which technology to choose issues such as e.g. one or more of the following therefore may need to be considered to various extents.

Amount of data stored
Frequency of reads
Frequency of writes
Requirements on latency
Requirements on consistency
Requirements on availability
Retention period
Logical and physical structure of the data
Online transactions processing (OLTP) versus decision support Therefore, the more complex the process for selecting database technology becomes, the more evident it is that there is a desire for a more flexible and efficient selection process, not only, when initially choosing the most optimal database technology, but also after a database technology has been chosen and changed user behaviour and following change in the user pattern of the database technology can be identified Obviously there is a problem of how to efficiently select a database technology that best fits present data access pattern requirements and needs from the applications which have access to the data, and also how to determine that the database technology should be changed from the one presently used to another one more suitable to a new scenario.

Today this type of demand e.g. for determining that an application should preferably shift from e.g. a relational data base technology to a key value store, require a great effort from database expertise. Some claim that the work to handle data access may sum up to close to 80% of the total application developer time consumed, and therefore methods for making this process more simplistic are needed.

SUMMARY

The object of the present document is to eliminate or at least reduce the problems outlined above. In particular it is an object of the present document to provide a solution for selecting and adapting database technology, or data storage type, to be used for storing data handled by one or more applications.

According to one aspect a method for analyzing data storage applied on at least one data storage type is provided, wherein the data to be stored is transmitted in at least one data stream between at least one application instance and the at least one data storage type. The suggested method is executed by accessing, from the at least one data stream, data selected according to pre-defined rules; aggregating data access patterns, on the basis of the selected data, the data access patterns being indicative of the at least one storage type applied; classifying the aggregated data access patterns by applying a trained classifier to the aggregated data access patterns; analyzing differences between the result from said classification and a previous classification settings and determining, that analyzed differences are indicative of a preferred change of data storage type, in case differences exceed at least one predefined threshold value.

Typically, the classifying is executed by applying machine learning.

The classifier is normally trained by executing an automatic training process, typically by executing machine learning also on this process. Such a process is initiated by a predefined trigger, which may e.g. be identifying a new application instance or data storage type.

The determining step may also comprise the further step of executing a trend analysis on the identified difference for verifying if the difference is representing a consistent change and for performing the determining step in case a consistent change is verified by the trend analysis. Thereby a consistent change can be distinguished from temporary fluctuations, and thus, the accuracy of the result from the analysis mentioned above will be improved.

The aggregating typically comprises aggregating a number of parameters or operations per application instance, such that the aggregated data provide a good representation of how a respective application instance is making use of the selected and used data storage type. The aggregating may be executed on a periodical basis.

According to one embodiment, the determining step comprise the further step of changing the at least one data storage type to the one indicated in the determining step. Alternatively, an identified preferred change of data storage type may result in providing a suggestion to change data storage type to an operator.

According to another aspect, a processing device for analyzing data storage applied on at least one data storage type is suggested, where the data is transmitted in at least one data stream between at least one application instance and the at least one data storage type, comprising a processor and a memory capable of storing computer readable instructions which when executed by the processor causes the processing device to: access, from the at least one data stream, data selected according to pre-defined rules; aggregate data access patterns, on the basis of the selected data, the data access patterns being indicative of the at least one storage type applied; classify the aggregated data access patterns by applying trained classifiers to the aggregated data access patterns; analyze differences between the result from the classification and previous classification settings and determine that analyzed differences are indicative of a preferred change of data storage type, in case differences exceed at least one predefined threshold value.

Normally, the memory is capable of storing computer readable instructions which when executed by the processor causes the processing device to obtain classifiers by applying machine learning.

Typically, the memory is also capable of storing computer readable instructions which when executed by the processor causes the processing device to train classifiers by executing an automatic training process, where the classifiers are typically trained at predefined time intervals and upon recognizing a trigger to initiate such a process. Such a trigger may e.g. be that a new application instance or data storage type mas been identified by the processing device.

The memory is also typically capable of storing computer readable instructions which when executed by the processor causes the processing device to aggregate at least one predefined parameter or operation per application instance.

Typically, the memory is also capable of storing computer readable instructions which when executed by the processor causes the processing device to aggregate data periodically.

According to one embodiment, the memory is capable of storing computer readable instructions which when executed by the processor causes the processing device to initiate changing of the at least one data storage type to the one indicated by the obtained classifiers. Alternatively, the processing device may instead be caused to provide instructions suggesting a change to an operator.

According to another aspect a computer program for analyzing data storage applied on at least one data storage type is suggested, where data to be stored is transmitted in at least one data stream between at least one application instance and the at least one data storage type, the computer program comprising computer readable code means which when run on a computer causes the computer to: access, from the at least one data stream, data selected according to pre-defined rules; aggregate data access patterns, on the basis of the selected data, the data access patterns being indicative of the at least one storage type applied; classify the aggregated data by applying a trained classifier to the aggregated data access patterns; analyze differences between the result from the classification and the previous classification settings, and determine, that analyzed differences are indicative of a preferred change of data storage type, in case differences exceed at least one predefined threshold value.

According to another aspect the processing device suggested above may instead be described as comprising a plurality of interacting modules, where, according to one embodiment, such a processing device may comprise an accessing module for accessing, from the at least one data stream, data selected according to pre-defined rules; an aggregating module for aggregating data access patterns, on the basis of the selected data, the data access patterns being indicative of the at least one storage type applied; a classifying module for classifying the aggregated data access patterns by applying a trained classifier to the aggregated data access patterns; an analyzing a determining module for determining that analyzed differences are indicative of a preferred change of data storage type, in case differences exceed at least one predefined threshold value.

According to yet another aspect, a computer program product is provided, which comprise computer readable code means and a computer program as suggested above according to any of the described embodiments, where the computer program is stored on the computer readable code means.

BRIEF DESCRIPTION OF THE DRAWINGS

The objects, advantages and effects as well as features disclosed herein will be more readily understood from the following detailed description of exemplary embodiments when read together with the accompanying drawings, in which.

DETAILED DESCRIPTION

Figure 1:
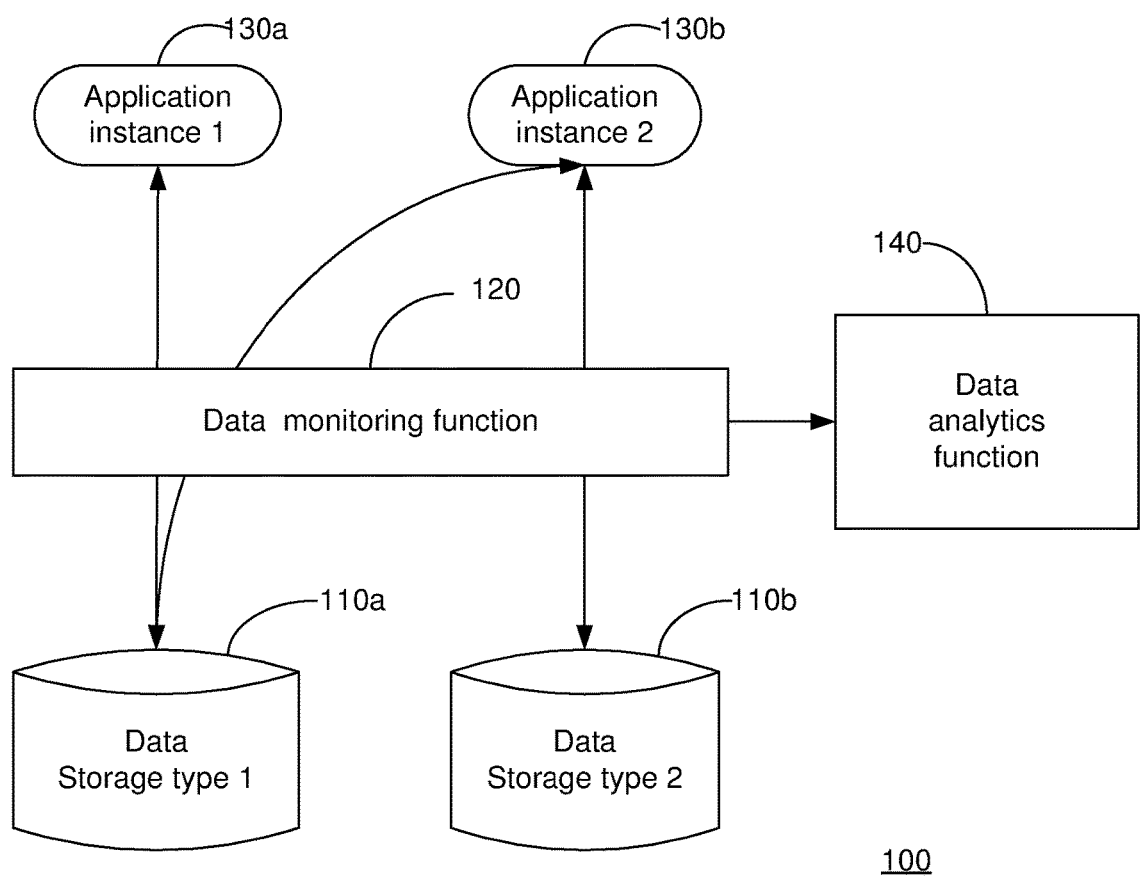
FIG. 1 is a simplified system overview of a system capable of evaluating use of data storage types.

The present document refers to a method for selecting and adapting database technology, or data storage type, to be used for storing data handled by one or more applications, where such a selection and adaptation is based on the characteristics of data storage and data access patterns associated with the one or more applications connected to the data storage types under investigation and a system or processing device configured to execute such a method.

One scenario which can exemplify the desire to identify changes in the way applications make use of data storage is when Instagram changed their applications from allowing only handling of pictures to also allowing short film sequences of a duration of maximum 15 s. Such a change will have great impact not only on how the network is used, but also on how data is being stored at the service provider.

If a plurality of applications are using the same data storage type, it will be possible to discover changes on how data is stored, i.e. in the data access patterns at a relatively early stage. This is due to the fact that more and better training data can be obtained, which will result in a more accurate classification.

Another scenario refers to Spotify, which have identified a need to change how they store their data, much due to the large increase of music files (the number exceeding 10 TB) that are being distributed each day.

Both scenarios mentioned above represent very clear examples of a change of user behaviour, which also is reflected in changed data access patterns, but also, what may appear as more moderate changes can be identified by applying the suggested mechanism. By studying Key Performance Identifiers (KPIs) it may be possible to identify also minor changes. In that sense it is to be preferred that the KPIs that yields the largest performance increase are identified and used in the supervised learning process. KPIs that it may be worth wile to identify can e.g. include one or more of: response time for queries, throughput of the entire data traffic associated with a certain application or a number of applications, and the throughput of traffic which is rated as the most important traffic, such that e.g. reads may be considered to be more important that writes. Other important information to consider may e.g. be to identify if the applied data storage type/s is/are used basically for decision support solutions or update intensive solutions. Another KPI which may be of interest may relate to identification of inconsistencies in the data. Aggregation of data and storage of data usage patterns may thus be executed based on specific KPIs.

Corresponding scenarios may also be applied for other types of applications. According to one example, when using a machine to machine (M2M) device, comprising an RFID reader, a system such as the one described herein may be configured to identify and store the number of identification cards that are read each minute. Initially all such data may be storable in a RAM memory of a server located at close vicinity to the RFID reader, but, as more and more people are registered by the RFID reader, the need of another way of storing the data, such as e.g. storage on a disc, or storing at a distributed storing system, such as e.g. HDFS, may be evident. The combination of which KPIs to interrogate, in the present case, number of persons passing the RFID reader each minute, the size of each reading that need to be sent, configuration parameters used for storing data etc. in combination with the rules applied for determining which data storage type to apply, e.g. if storage demand exceeds a threshold value of 80% of available RAM size, storage on disc is preferred, will determine the outcome of execution of the suggested process.

An arrangement 100 for performing the tasks mentioned above can be described in general terms according to FIG. 1. Data communication between one or more data storage units of different types, here exemplified with two different data storage types 110a, 110b and application instances, here represented by two application instances 130a, 130b, is monitored by a data monitoring function 120 in order to identify patterns in the data communication, herein referred to as data access patterns.

By application instance we here imply that an application may be divided into a plurality of application instances, where each application instance, may give rise to different user behaviour on a respective data storage type, and thus should be treated separately when executing the method as suggested herein. More specifically, application instance may be distinguished from each other by considering parameters and/or KPIs which are representative for a respective application instance.

By analysing a classifier associated with certain data access patterns it can be determined whether or not a change of data storage type is required. Throughout this document change of data storage type can equally be referred to as change of data storage or data base technology. Functionality for determining whether or not a change is to be preferred is here provided by a data analytics function 140.

Figure 2:
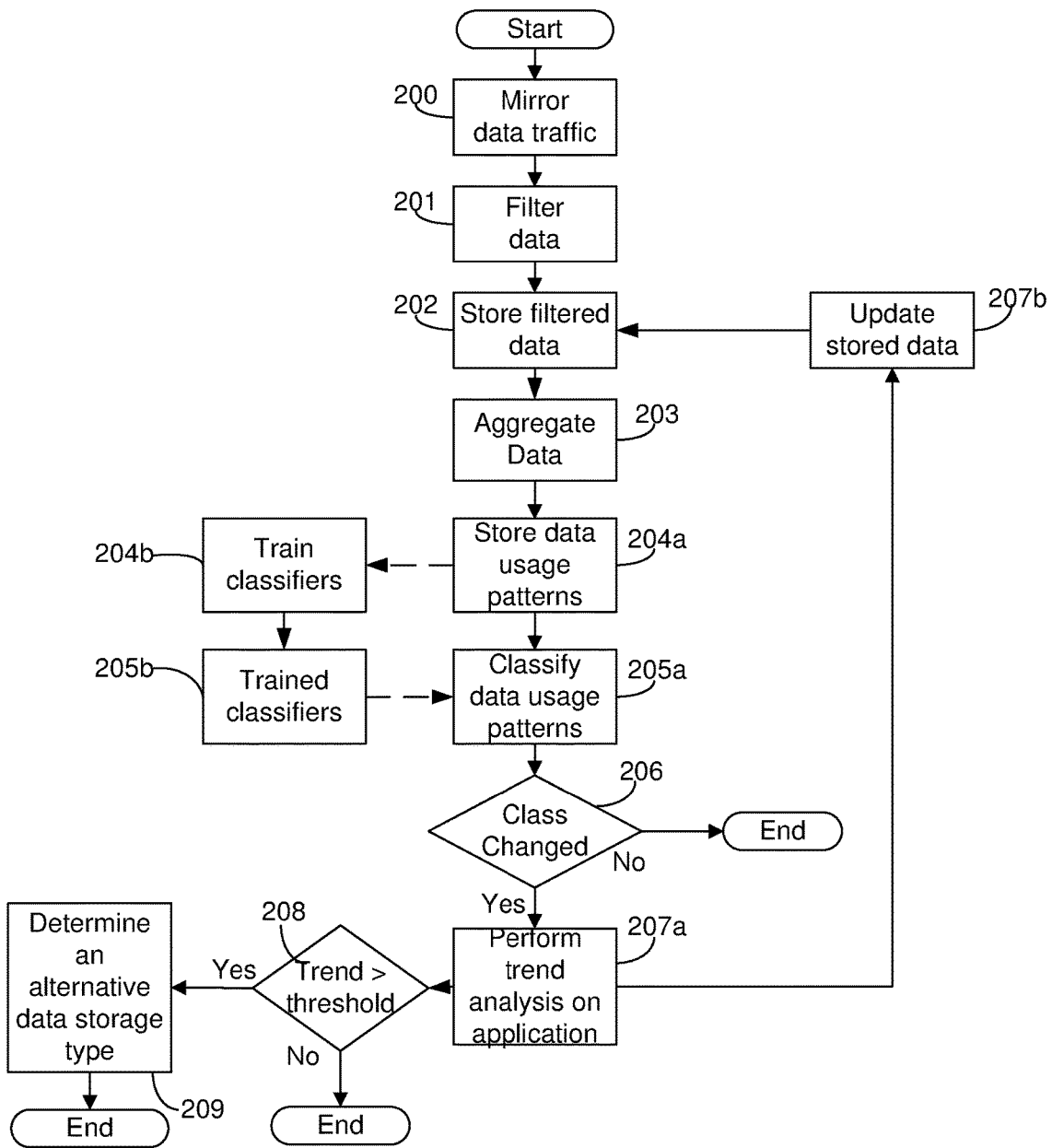
FIG. 2 is a flow chart illustrating a method for determining if a change of data storage type is required.

A method for determining if a technology change is required, which can be executed on a system such as the one described above with reference to FIG. 1 will now be described with reference to the flow chart of FIG. 2. The procedure as described in FIG. 2 is a procedure which is regularly executed, at least at each deployment, in order to analyze if a change of data storage type is required. Each deployment of the suggested arrangement will analyze if a change of data storage type is found to be preferred. This can either be done periodically, or based on a trigger, or as a combination of both. One typical trigger may e.g. be that a new application instance has started to apply the described process, while another way of trigger this procedure may be by identifying a change of a data set that exceeds a predefined amount. The latter case could be determined by specifying the scarcity of data, the number of rows and/or entries, number of requests per minute for certain data and/or the time it takes to input certain data. As a prerequisite it is assumed that data has been processed and stored into one or more selected data storage types for some time, e.g. for a week, before such an analysis is first executed.

As indicated with a first step 200, data traffic which is transmitted between application instances, and applied data storage types is being monitored and mirrored. This is due to that the monitoring shall not cause any delay to the applications when applying the data storage and, thus, this process need to be transparent to the applications and storage types/data bases.

Due to bandwidth and/or storage constraints, only data of the mirrored data that is considered necessary for pattern analysis is to be stored for further processing and evaluation. The mirrored data is therefore filtered in a next step 201. Suitable filtering rules are used in order to avoid storing and processing of data that is not considered relevant for any future pattern analysis. An example of one typical filtering rule is to filter out the actual data from data retrieved in a read operation, since what is of interest here are the properties of the read and not the actual content or values of the read operation. Since usually content of the file headers provide enough of information for making the required analysis, e.g. for determining nr of bytes, content type of the data traffic, the filtering may comprise removal of the actual user data content from the data traffic, only maintaining the respective headers.

In a next step 202, the filtered data is stored in order to enable subsequent aggregation of the filtered data, as indicated with step 203, and following analysis of the data. Aggregation of data may also be referred to herein as identifying data usage patterns, or data access patterns, where such a pattern is representative of monitored and filtered data traffic associated with a specific application instance. More specifically, a data access pattern identified from monitoring data originating from a certain application instance when using a certain data storage type is a representation of the monitored data storage usage for that application instance. Application instance here is to be construed as representing one or more data sets, where each data set can have different data storage needs. By being able to define and consider separate activities associated with an application instance, rather than activities associated only with a specific application, it will be possible to use different data storage types for different tasks performed from the same application, but from different application instances, and thus to come to different conclusions as to which data storage type to prefer for different application instances. By way of example, when executing an application, certain processes, or application instances, may e.g. to a large extent apply storage of bank transactions, while another application instance is more concentrated towards storing less sensitive data, where these two application instances typically generate totally different data usage patterns.

For clarification, it is to be understood that, an application instance may include all data sets handled by an application, or only one or more specific data set. The described process is therefore executed for each application instance for which we are interested to keep updated of the most suitable data storage type.

The monitoring and mirroring period mentioned above may be configured depending on the type of application instance monitored, such that e.g. for a specific type of application instance monitoring is executed a couple of days each month, while the filtered data is being aggregated every third month. This may be achieved by periodically aggregating a subset of the filtered data per application instance. The aggregated data typically is specified as a monitoring of a number of parameters or operations which may e.g. be selected from one or more of the number of reads, creates, updates, deletes, average size of data or amount of data stored or processed by a respective application instance. In addition, parameters, such as e.g. time stamps, indicating when in time a respective operation has taken place, indications on how much interaction of a respective operation is ongoing between the application instances and the data storage types and/or parameters specifying the structure of the stored data, may also be considered. In a subsequent step 204a retrieved data usage patterns are stored both for future use, and for the purpose of training a classifier, whenever required.

Which parameters to consider for obtaining data usage patterns can be determined e.g. by applying dimension reduction, i.e. Principal Component Analysis (PCA). Alternatively, parameters to consider may be selected manually, based on knowledge and experience from the data storage field. The more representative for the data storage usage of the respective application instance the selected parameters are, the better the described process will be at selecting the most suitable data storage type.

A data usage pattern may be based on measures specifying some of the following operations/parameters:

Ratio of reads is X %
Nr of read per hour is Y reads/hour
Ratio of write is A %
Nr of writes per hour is B writes/hour
Amount of data read is on average C bytes per read and amount of data written is on average D bytes per write Parameters of interest may also include manually configured settings, which may e.g. indicate data as being business critical or not and/or data as being privacy sensitive data or not. The parameters used should preferably be representative of the most common operations executed by the application instance under investigation.

In a subsequent step 205a, the aggregated data, now constituting previously stored data usage patterns, is used for classification, such that, for a respective application instance a storage need is best reflected by a recently acquired, or a previously stored data access pattern. More specifically, the result from this step will be that each application instance can be said to belong to a certain data storage class with a certain probability, where each data storage class is representing a data storage type such that e.g. application A belongs to data storage class/type "transactional" with the probability 0.6 and data storage class/type "analytic" with probability 0.4, and thus the most preferred data storage class/type for application A is "transactional".

This process is executed by applying a trained classifier on the aggregated data access patterns, i.e. by using the aggregated data access patterns as input data to the trained classifier, which will result in a class/type which is most representative for a respective data access pattern and associated application instance. This process may also be referred to as a classification process. The mentioned trained classifier is a classifier which have been previously trained, typically in an automatic training process, and normally by way of performing a machine learning process, or which have been manually configured based on manually applied configuration rules, e.g. in case there is not enough of input data available from the process to apply. The latter situation is e.g. useable at an initial stage, where not enough of aggregated data are yet available. A process for training a classifier, is here indicated with steps 204b and the resulting trained classifier, as indicated in step 205b, are occasionally used as input data, which may also be referred to as a labelled data set, in step 205a together with new, unlabelled data, provided in the form of data usage patterns. The training process will be described in further detail below with reference to FIGS. 3 and 4.

It is to be understood that while steps 204a and 205b are regularly executed subsequent to step 203, steps 204b and 205b are normally executed as an off-line process at less frequent intervals compared to the main process, including steps 204a and 205a. The training process may e.g. be triggered when a new application has been introduced or when it has been used in the system for a certain pre-defined time interval.

In a next step 206, an analysing step is executed, which includes a check of the difference between the result from the classification executed in step 205a and previous classification settings, in order to determine if the classification executed in step 205a indicates a required change of data storage type.

More specifically, previous classification settings are represented either by the result from the most previous analysing of differences that has been executed. In case there has not been any earlier analysis executed, due to that there is no relevant data access patterns available yet, the previous classification settings may instead comprise manually entered classification data.

Since previous classes/types are stored, they can be regularly evaluated. If it is found that the class/type has not changed since the previous classification settings, or more specifically it has not changed more than a predefined threshold value, the flow is ended and will again be repeated, starting at step 200, either at a predefined rate, or once it is triggered to be repeated by a predefined trigger. The other "end" branches, of FIG. 2 are to be construed in a similar manner. If, however, it is determined that the class/type has changed more than a predefined threshold level then a trend analysis is to be performed for the respective application instance under investigation, in order to verify that an identified difference is indeed a reflection of a persistent change, rather than a temporary fluctuation. By way of example, a change of the probability of the presently applied data storage type compared to the previous classification settings, which exceeds 10% may indicate that a preferred change should occur. Alternatively, a trend analysis may be initiated first, as indicated in a subsequent step 207a, in order to verify that an identified difference is indeed a reflection of a persistent change, rather than a temporary fluctuation A trend analysis can be performed in case a change of class/type is identified in step 205a compared to the previous data classification, for determining how the class/type values change over time i.e. for determining if an indication of a class/type change is likely to persist or if it can instead be considered to be the result only of a temporal fluctuation. In other words, one challenge is here to be able to separate a trend from random noise. One method for executing such a trend analysis is to consider a class/type change as an indication for a required change of data store type or database technology only when a predefined threshold value has been reached repeatedly during a predefined time interval, as indicated with step 208. The threshold value to be applied here could preferably be selected based on experience gained from analysis of earlier manually executed tests.

If there has been an indication in steps 207a/208 that a trend is likely to be persistent, the executed process will end with determining a new preferred data storage type, i.e. a new data storage type, now having a highest probability, that can from now on be recommended to, or applied in the system, as indicated with a final step 209. Such a conclusion may either be provided as input data, usable for future manual decisions, or as input data which is used for controlling a mechanism to initiate an automatic change of data storage type for the respective application instance.

Figure 3:
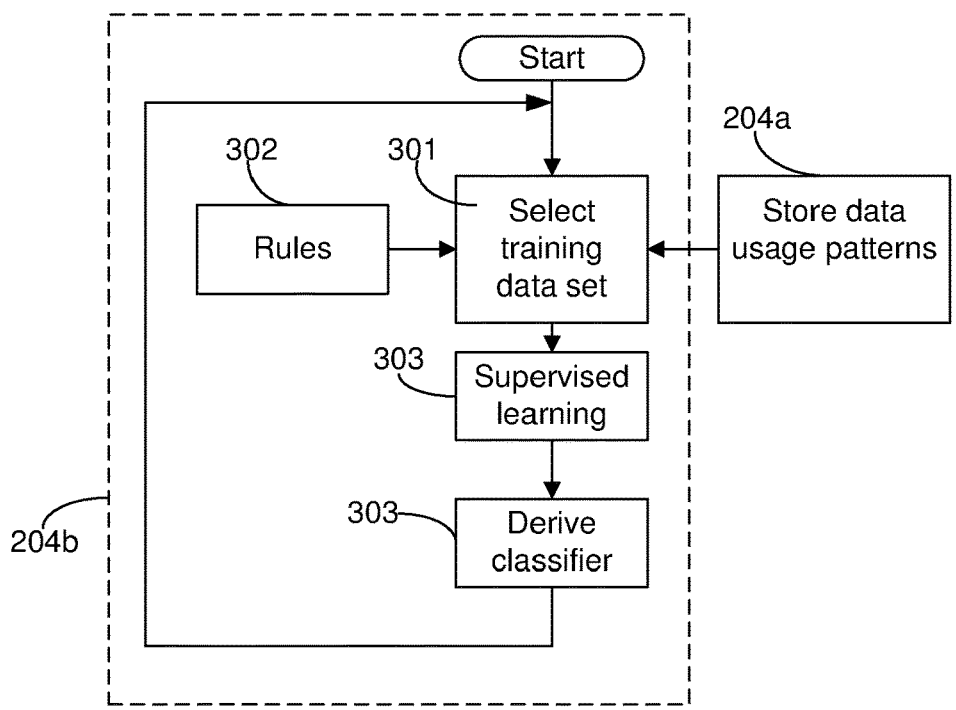
FIG. 3 is another flow chart illustrating a method for training a classifier.

A training process for training a classifier, provided in step 204b, and used in step 205a, in FIG. 2, as mentioned above, will now be described in further detail with reference to FIG. 3. As already indicated above, the training process, which may also be referred to as a learning process, is normally performed off-line on available historic data, i.e. previously monitored and processed data, whenever required, i.e. it need not, but may, be executed at certain predefined intervals, but rather on demand, wherein data usage patterns, stored on step 204a of FIG. 2 are used as input data to the training process. This process should be executed at least before the initial deployment for selecting preferred data storage type, and also when a new, previously not used, data storage type has been introduced into the system, or when a new application instance with a different usage pattern has been introduced into the system. The procedure described with reference to FIG. 3 may alternatively be executed on a more regular basis in order to fine tune the system. In the latter case, such fine tuning can be executed occasionally, either automatically, initiated by some predefined trigger, or manually, or as a combination of both.

Figure 4:
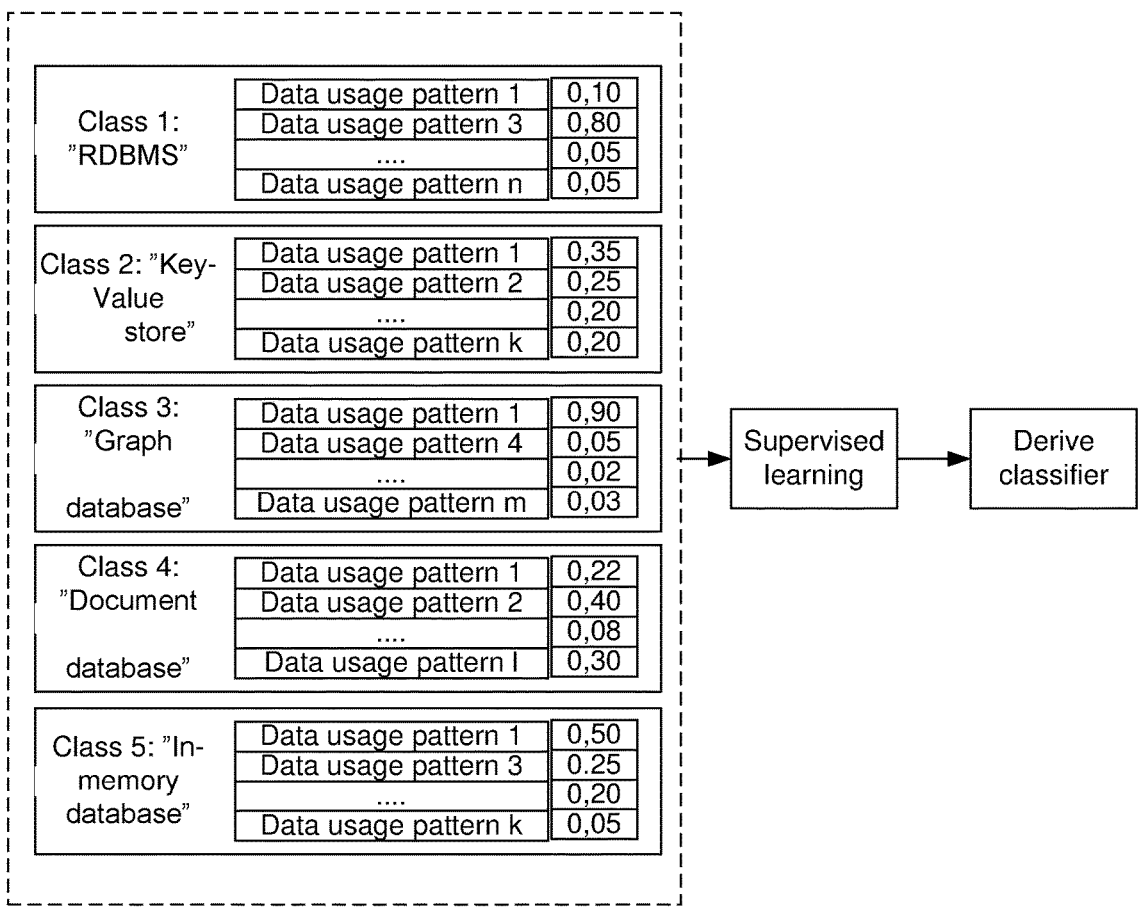
FIG. 4 is an illustration of how a classifier can be derived from different classes.

A supervised training model is used with a labelled training data set, i.e. to each class of data storage type there is one or more associated data usage patterns, each with a specific probability associated with the class/type, as indicated e.g. in FIG. 4.

A training data set is usually derived as a subset, such as e.g. 60-80% of the data usage patterns previously provided in steps 203 and stored in step 204a of FIG. 2, forming a representative selection of the total data usage patterns. More specifically, a certain amount of available data usage patterns may be selected randomly. In FIG. 3, such a selection is made in step 301 based on data usage patterns selected from the ones previously stored and provided in step 204a.

Alternatively, a number of known successful well performing combinations of data storage types and corresponding communication patterns are selected in step 301. In any event the selection of data usage patterns should be done so that relatively fresh data is acquired, so that the trained classifier will eventually represent current usage patterns.

A training data set, which may also be referred to as a labelled data set, is required in order to develop a model that can be used for classifying new unlabelled data base traffic. In the training set a number of selected data usage patterns and a number of resulting classes, each representing a specific data storage type, or database technology, are selected to be used for training of the classifier. An example of such a training set is illustrated in FIG. 4, where, for each class there are a number of associated data usage patterns. More classes can be added to the training process whenever required. Step 302 of FIG. 3 illustrates how rules are applied for selecting a representative training data set out of the stored data usage patterns. Such rules could e.g. specify that only relatively fresh samples of training data are to be selected, such data that e.g. data older than one year is never selected. Another rule may be to ignore data associated with a certain data storage type, e.g. since this type will no longer be supported.

In a next step 303 supervised learning is applied on the selected training data set, and, as a result, trained classifier, i.e. classes associated to different data usage patterns with certain probability, are provided in a subsequent step 304, which can be used as input data in step 205a.

There are a number of known supervised machine learning methods that may be used in the training process, and thus, how to execute the machine learning process as such is out of scope of this document. However, by way of example, Support Vector Machine (SVM) allows classes to be divided by a gap that is as wide as possible. Random Forest, which is one of the most accurate learning algorithms available today, runs efficiently on large data volumes. It is effective for estimating missing data and maintains accuracy when a large portion of data is missing. Neural networks consist of nodes, typically referred to as artificial neurons that are divided in layers. Neural networks are trained to create a model that can correctly classify data. In decision tree structures, leaves represent class labels and branches represent conjunctions of features that lead to those class labels.

Starting with a number of data usage patterns, each associated with one or more different classes, here represented by different data storage types, as data input, the outcome of the supervised learning will be a number of derived classifier, i.e. for each class, each associated data usage pattern will have an associated likelihood, such a result may be referred herein to as obtained classifier.

Figure 5:
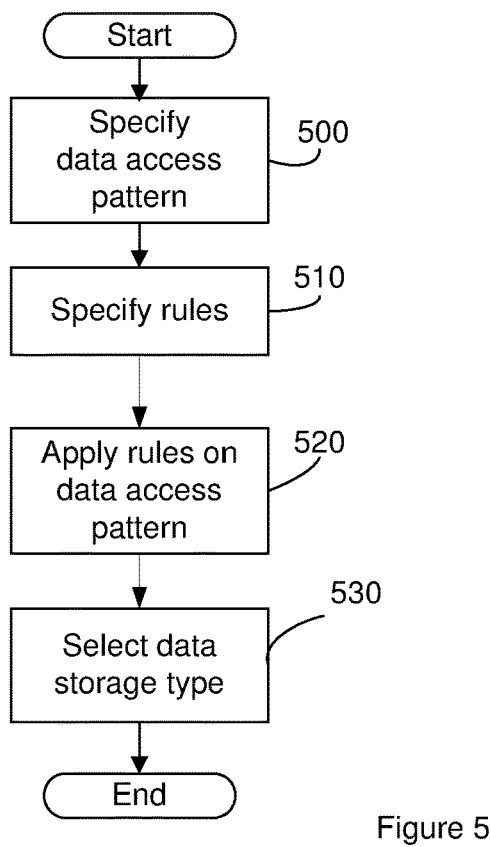
FIG. 5 is yet another flow chart, illustrating how initial data storage type selection can be executed.

Initially, i.e. when a new application instance or data storage type is introduced there will not be any data associated with that application instance or data storage type available to do any analytics on. Therefore one could either try to acquire representative training data if available from any other system as a starting point, or use a rule based solution as describe in FIG. 5. In a first step 500 a representative data usage pattern is specified. In a next step 510 rules to apply in the described process are specified, and in a next step 520, the specified rules are applied on the data access patterns, such that finally a data storage type can be selected, as indicated in step 530.

Figure 6A:
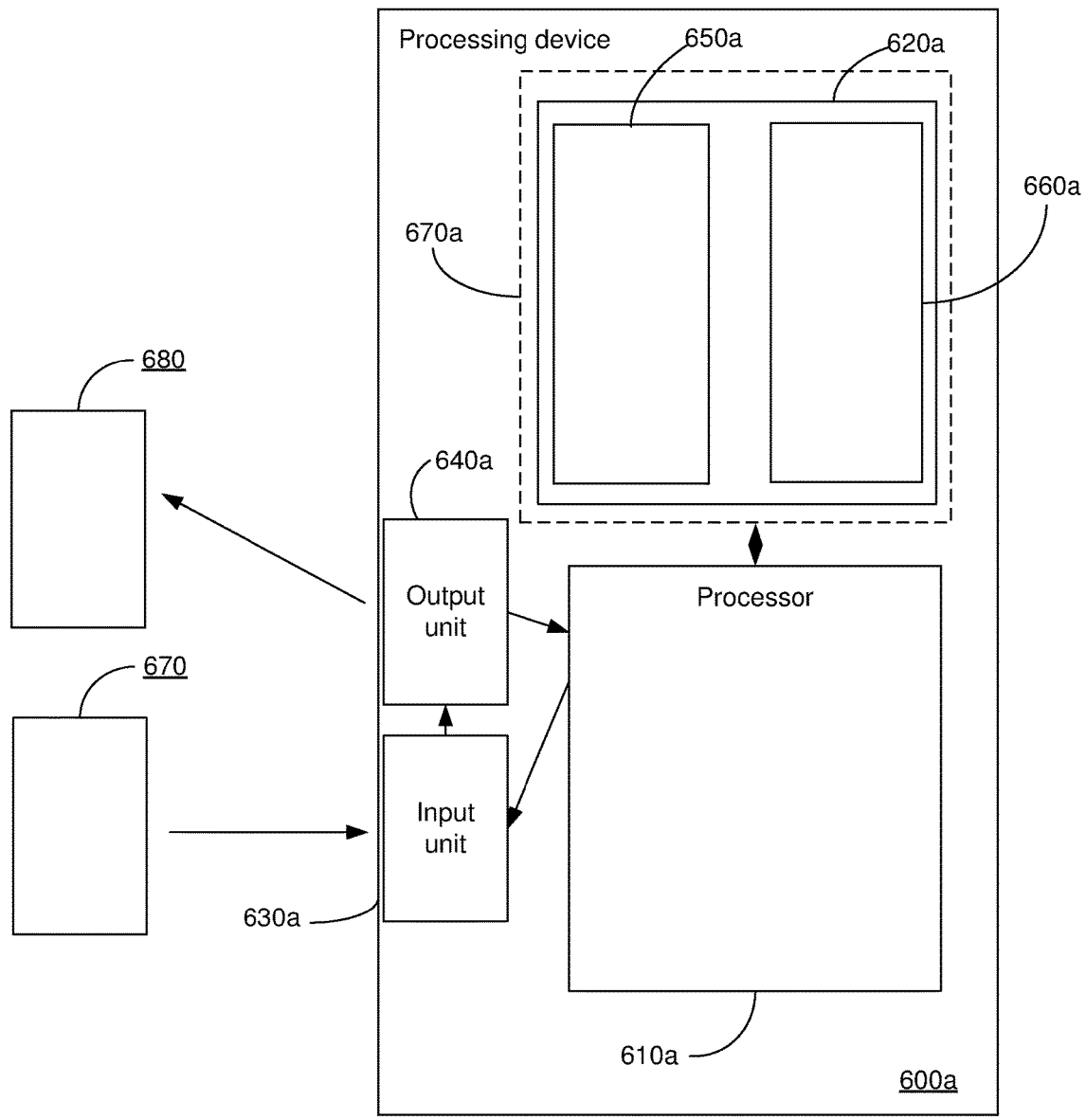
FIG. 6a is a block scheme illustrating an arrangement for performing any of the methods described herein, according to a first embodiment.

FIG. 6a is a simplified block scheme illustrating a processing device, operable as a computer, i.e. operable by executing computer readable instructions, which is capable of executing a method, such as the one described above with reference to FIGS. 2, 3 and 5.

More specifically the processing device is configured to analyse data storage in one or more data storage types, where the data to be analysed is transmitted in one or more data streams between at least one application instance and the available one or more data storage types.

According to one embodiment, the processing device comprise a processor 610a and a memory 620a, capable of storing computer readable instructions 650a, herein also referred to as computer readable means, which when executed by the processor 610a causes the processing device 600a to: access, from the at least one data stream, data selected according to pre-defined rules; aggregate data access patterns, on the basis of the selected data, the data access patterns being indicative of the at least one storage type applied; obtain a classifier by applying a trained classifier to the aggregated data access patterns; analyze differences between the obtained classifiers and the trained classifier and determine, that the obtained classifier are indicative of at least one data storage type other than a presently used data storage type, in case at least one pre-defined threshold value is exceeded when analyzing said difference.

The processing device 600a comprises one or more processors, here illustrated by processor 610a, which may be a single CPU (Central processing unit), but could alternatively comprise two or more processing units. For example, the processor 610a may include one or more general purpose microprocessors, instruction set processors and/or related chips sets and/or special or forming part of a general purpose computer.

The processing device 600a is typically configured to access data by monitoring, by way of mirroring, data provided to one or more data storage types from one or more application instances and filtering acquired data from the monitored data according to predefined filtering rules or conditions. The classifying is typically executed by performing machine learning e.g. according to any of the alternative machine learning methods mentioned previously in this document and may be configured as an automatic training process which is automatically initiated when a predefined event occurs, such as e.g. an initiated use of a new data storage type or a new application instance. More specifically, the processing unit may be configured to receive manually entered inputs of such a change or automatic triggers, capable of identifying e.g. a new data storage type. The process of training classifiers is a process which is executed separate from the main process mentioned above. Therefore, the processing device may be configured to execute the training process at predefined time intervals. When a persistent change has been identified in the analyzing process, the processing device is, according to one embodiment, configured to change each data storage type for which such a change has been identified to the one indicated by the obtained classifiers, e.g. by controlling any type of appropriate switching mechanism 680, via an output unit 640a. Such switching mechanisms are well known to the skilled person, and is therefore out of the scope of this document. Alternatively, the processing device may be configured to provide the result of the analysis to an operator, which is thereby allowed to make his own decision based on such information.

The processing device 600a may also be configured to perform a trend analysis, which is configured to execute a trend analysis on the difference between trained and obtained classifiers, for determining if the difference is representing a consistent change or is to be considered as changes which are only due to fluctuations. The trend analysis may be executed according to any known procedure and, thus, further details on this functionality is therefore out of the scope of this document.

The processing device is configured to execute aggregation based on one or more predefined parameters and/or operations per application instance. As a consequence, different processes can be executed for each application instance for which it is a desire to perform the described evaluation process and different parameters and/or operations can be used as a basis for evaluation for different application instances. Typically the processing device is configured to execute the aggregation process periodically in order to obtain input data which is representative to the behavior of the ongoing data storage. The processing device may be configured to execute the processes described above by controlling a plurality of interacting modules. According to another embodiment, such a processing unit 600*b* comprises an input unit 630*b* via which a module, here referred to as a accessing module 1011*b* is configured to access data provided from an application instance 670. More specifically the accessing module 1011*b* may comprise a monitoring module or functionality configured to mirror and monitor such data. In addition, the accessing module 1011*b* may typically comprise a filtering module or functionality configured to filter out specific data according to predefined rules. The processing device 600*b*, also comprises a plurality of other modules which are configured to interact with each other, here represented by an aggregating module 1012*b*, configured to aggregate accessed data; a classifying module 1013*b*, configured to classify data, and a determining module 1015*b*, configured to determine, based on analysed data whether a change of data storage type is preferred or not, all according to the configuration described above, with reference to the first embodiment and FIG. 6*a*. The processing device 600*b* may also comprise a trend analysis module 1016*b*, which is configured to perform a trend analysis, for whether a change of classes reflects a trend or only fluctuations. In addition, the processing device 600*a* is configured to store accessed data, data usage patterns and classifiers in a data storage 660*b*. The processing device 600*b* also typically comprise an output unit 640*b* for enabling the processing device 600*b* to communicate with external units and entities, e.g. such that it can initiate change of data storage type at a device capable of executing such a change, or such that it can provide such advice to an operator.

Figure 6B:
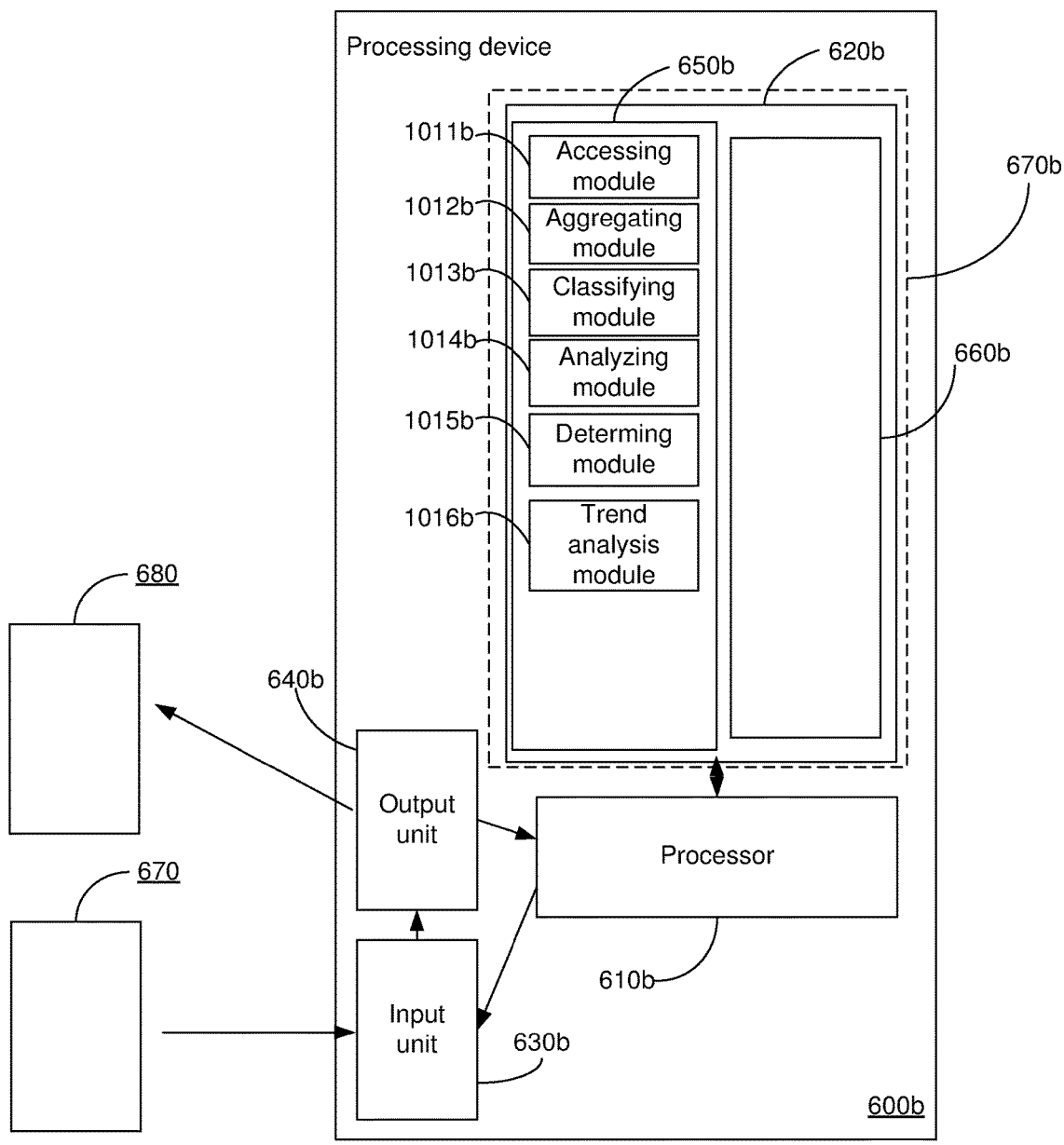
FIG. 6b is another block scheme illustrating an arrangement for performing any of the methods described herein, according to a second embodiment.

As indicated in both FIGS. 6*a* and 6*b* memories 620*a*, 620*b* also both comprise persistent storage 660*a*, 660*b*, respectively, which, for example, can be any single one or combination of magnetic memory, optical memory, solid state memory or even remotely mounted memory, capable e.g. of storing monitored data, data usage patterns, pre-defined rules etc. determine if the classifying has changed since the most recent previous classifying, and determining an alternative data storage type based on the most recent classifying, in case of a changed classification.

The computer program 650*a*, 650*b* may be carried by a computer program product 670*a*, 670*b* connected to the respective processor 610*a*, 610*b*. The computer program product 670*a*, 670*b* may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the processing device 600*a*, 600*b*.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a data processing device that analyzes data applied to a data storage, the method comprising:
   monitoring the data that is transmitted in a data stream between an application instance and the data storage;
   responsive to monitoring the data, selecting data to mirror from the data transmitted in the data stream according to pre-defined rules;
   mirroring the selected data;
   identifying data storage access patterns between the application instance and the data storage based on the mirrored data;
   responsive to identifying the data storage access patterns, aggregating the data storage access patterns based on a data storage technology type of the data storage applied in each data storage access pattern;
   inputting the aggregated data storage access patterns into a trained classifier to determine a classification of the aggregated data access patterns;
   determining a difference between the classification of the aggregated data access patterns and previous classification settings of previously aggregated data storage access patterns;
   determining that the difference indicates that a change of data storage technology type of the data storage is needed based on the difference exceeding at least one predefined threshold value; and
   responsive to determining the difference exceeds the at least one predefined threshold value, controlling the data storage to cease using a first data storage type to store the data transmitted in the data stream between the application instance and the data storage and to begin using a second data storage type to store further data to be transmitted in the data stream between the application instance and the data storage.

2. The method according to claim 1, wherein selecting data to mirror from the data transmitted in the data stream according to pre-defined rules comprises filtering out actual user data content from the data transmitted in the data stream.

3. The method according to claim 1, wherein selecting data to mirror from the data transmitted in the data stream according to pre-defined rules comprises selecting data from headers of data traffic in the data stream to mirror.

4. The method according to claim 1, wherein the trained classifier determines a classification of the aggregated data access patterns based on a probability that the aggregated data access patterns are associated with a data storage class type.

5. The method according to claim 1, wherein determining that the difference indicates that a change of data storage technology type of the data storage is needed based on the difference exceeding at least one predefined threshold value comprises determining the difference exceeds the at least one predefined threshold value repeatedly during a pre-defined time interval.

6. The method according to claim 1, wherein aggregating the data storage access patterns comprises aggregating a number of parameters or operations per application instance.

7. The method according to claim 1, wherein aggregating the data storage access patterns comprises aggregating the data storage access patterns periodically.

8. A processing device that analyzes data applied to a data storage, the processing device comprising a processor and a memory storing computer readable instructions which when executed by the processor causes the processing device to:

monitor data that is transmitted in a data stream between an application instance and the data storage;

responsive to monitoring the data, select data to mirror from the data transmitted in the data stream according to pre-defined rules;

mirror the selected data;

identify data storage access patterns between the application instance and the data storage based on the mirrored data;

responsive to the identification of the data storage access patterns, aggregating the data storage access patterns based on a data storage technology type of the data storage applied in each data storage access pattern;

input the aggregated data storage access patterns into a trained classifier to determine a classification of the aggregated data access patterns;

determine a difference between the classification of the aggregated data access patterns and previous classification settings of previously aggregated data storage access patterns;

determine that the difference indicates that a change of data storage technology type of the data storage is needed based on the difference exceeding at least one predefined threshold value; and responsive to the determination that the difference exceeds the at least one predefined threshold value, control the data storage to cease using a first data storage type to store the data transmitted in the data stream between the application instance and the data storage and to begin using a second data storage type to store further data to be transmitted in the data stream between the application instance and the data storage.

9. The processing device according to claim 8, wherein the memory is stores computer readable instructions which when executed by the processor causes the processing device to select the data to mirror from the data transmitted in the data stream according to pre-defined rules by filtering out actual user data content from the data transmitted in the data stream.

10. The processing device according to claim 8, wherein memory is stores computer readable instructions which when executed by the processor causes the processing device to select the data to mirror from the data transmitted in the data stream according to pre-defined rules by selecting data from headers of data traffic in the data stream to mirror.

11. The processing device according to claim 8, wherein the memory is stores computer readable instructions which when executed by the processor causes the processing device to train the classifier at predefined time intervals based on previously monitored data transmitted between the application instance and the data storage.

12. The processing device according to claim 8, wherein of the trained classifier is configured to determine a classification of the aggregated data access patterns based on a probability that the aggregated data access patterns are associated with a data storage class type.

13. The processing device according to claim 8, wherein the memory stores computer readable instructions which when executed by the processor causes the processing device to determine that the difference indicates that a change of data storage technology type of the data storage is needed based on the difference exceeding at least one predefined threshold value by determining the difference exceeds the at least one predefined threshold value repeatedly during a predefined time interval.

14. The processing device according to claim 8, wherein the memory is stores computer readable instructions which when executed by the processor causes the processing device to aggregate the data storage access patterns by aggregating a number of predefined parameters or operations per application instance.

15. The processing device according to claim 8, wherein the memory is stores computer readable instructions which when executed by the processor causes the processing device to aggregate the data storage access patterns periodically.

16. A computer program product comprising a non-transitory computer readable storage medium storing computer program code that analyzes data applied to a data storage, the computer program code when executed by a processor of a data processing device causes the processor to operate to:

monitor data that is transmitted in a data stream between an application instance and the data storage;

responsive to monitoring the data, select data to mirror from the data transmitted in the data stream according to pre-defined rules;

mirror the selected data;

identify data storage access patterns between the application instance and the data storage based on the mirrored data;

responsive to the identification of the data storage access patterns, aggregating the data storage access patterns based on a data storage technology type of the data storage applied in each data storage access pattern;

input the aggregated data storage access patterns by applying into a trained classifier to determine a classification of the aggregated data access patterns;

determine a difference between the classification of the aggregated data access patterns and previous classification settings of previously aggregated data storage access patterns;

determine that the difference indicates that a change of data storage technology type of the data storage is needed based on the difference exceeding at least one predefined threshold value; and responsive to the determination that the difference exceeds the at least one predefined threshold value, control the data storage to cease using a first data storage type to store the data transmitted in the data stream between the application instance and the data storage and to begin using a second data storage type to store further data to be transmitted in the data stream between the application instance and the data storage.

17. A system that analyzes data applied to a data storage, the system comprising:

a processor and a memory, the memory storing computer readable instructions that when executed by the processor causes the processor to perform operations comprising:

monitoring the data that is transmitted in a data stream between an application instance and the data storage;

responsive to monitoring the data, selecting data to mirror from the data transmitted in the data stream according to pre-defined rules;

mirroring the selected data;

identifying data storage access patterns between the application instance and the data storage based on the mirrored data;

responsive to identifying the data storage access patterns, aggregating the data storage access patterns based on a data storage technology type of the data storage applied in each data storage access pattern;

inputting the aggregated data storage access patterns into a trained classifier to determine a classification of the aggregated data access patterns;

determining a difference between the classification of the aggregated data access patterns and previous classification settings of previously aggregated data storage access patterns;

determining that the difference indicates that a change of data storage technology type is needed based on the difference exceeding at least one predefined threshold value; and responsive to determining the difference exceeds the at least one predefined threshold value, controlling the data storage to cease using a first data storage type to store the data transmitted in the data stream between the application instance and the data storage and to begin using a second data storage type to store further data to be transmitted in the data stream between the application instance and the data storage.

* * * * *